US010208960B2

(12) United States Patent
Brautsch et al.

(10) Patent No.: US 10,208,960 B2
(45) Date of Patent: Feb. 19, 2019

(54) METHOD FOR OPERATING A GAS TURBINE INSTALLATION AND EQUIPMENT FOR CARRYING OUT THE METHOD

(75) Inventors: Andreas Brautsch, Würenlingen (CH); Richard Carroni, Niederrohrdorf (CH)

(73) Assignee: ANSALDO ENERGIA SWITZERLAND AG, Baden (CH)

(*) Notice: Subject to any disclaimer, the term of this patent is extended or adjusted under 35 U.S.C. 154(b) by 1045 days.

(21) Appl. No.: 12/789,029

(22) Filed: May 27, 2010

(65) Prior Publication Data

US 2010/0269516 A1 Oct. 28, 2010

Related U.S. Application Data

(63) Continuation of application No. PCT/EP2008/065158, filed on Nov. 7, 2008.

(30) Foreign Application Priority Data

Nov. 27, 2007 (CH) ...................................... 1839/07

(51) Int. Cl.
F23R 3/36 (2006.01)
F02C 3/20 (2006.01)
(Continued)

(52) U.S. Cl.
CPC .................. *F23R 3/36* (2013.01); *F02C 3/14* (2013.01); *F02C 3/20* (2013.01); *F02C 3/28* (2013.01);
(Continued)

(58) Field of Classification Search
CPC .... F23C 2900/07002; F23C 2900/9901; F02C 3/28; F02C 6/003; F02C 9/40; F02C 3/20;
(Continued)

(56) References Cited

U.S. PATENT DOCUMENTS 2,647,568 A * 8/1953 Sloan ...................... F23D 11/00
431/176
4,667,467 A * 5/1987 Archer .................. F01K 23/067
48/202

(Continued)

FOREIGN PATENT DOCUMENTS

DE 102006053679 A1 5/2007
EP 0321809 A1 6/1989
(Continued)

OTHER PUBLICATIONS

Saw W et al., Production of hydrogen-rich syngas from steam gasification of blend of biosolids and wood using a dual fluidised bed gasifier, Sep. 18, 2011, Elsevier, Fuel (2011), doi:10.1016/j.fuel.2011.08.047.*

(Continued)

*Primary Examiner* — Gerald L Sung
*Assistant Examiner* — Alain Chau
(74) *Attorney, Agent, or Firm* — Buchanan Ingersoll & Rooney PC

(57) ABSTRACT

A method is provided for operating a gas turbine installation which has at least one compressor for compressing combustion air, at least one combustion chamber for combusting a supplied fuel, using the compressed combustion air, and also at least one turbine which is exposed to throughflow by the hot gases from the at least one combustion chamber. Both a first fuel on a carbon base, especially in the form of natural gas, and also a second fuel, in the form of a hydrogen-rich fuel or pure hydrogen, are used as fuel. A reduction of the $CO_2$ emission without basic modifications to the installation is achieved by the first and the second fuels being intermixed and combusted together in the at least one combustion chamber.

9 Claims, 2 Drawing Sheets

(51) Int. Cl.
*F23R 3/28* (2006.01)
*F23D 11/40* (2006.01)
*F02C 3/14* (2006.01)
*F02C 3/28* (2006.01)
*F02C 9/40* (2006.01)
*F02C 6/00* (2006.01)
*F02C 6/18* (2006.01)

(52) U.S. Cl.
CPC .............. *F02C 6/003* (2013.01); *F02C 6/18* (2013.01); *F02C 9/40* (2013.01); *F23D 11/402* (2013.01); *F23R 3/286* (2013.01); *F05D 2270/082* (2013.01); *F23C 2900/07002* (2013.01); *F23C 2900/9901* (2013.01); *F23D 2204/00* (2013.01); *Y02E 20/16* (2013.01); *Y02E 20/18* (2013.01)

(58) Field of Classification Search
CPC .... F02C 3/14; F02C 6/03; Y02E 20/18; F23R 3/28; F23R 3/286; F23R 3/36; F23D 2204/00; F23D 11/402
USPC .................................... 60/774, 780
See application file for complete search history.

(56) References Cited

U.S. PATENT DOCUMENTS

| | | |
|---|---|---|
| 4,714,480 A | 12/1987 | Wansink |
| 4,932,861 A | 6/1990 | Keller et al. |
| 4,936,869 A | 6/1990 | Minderman et al. |
| 4,957,515 A | 9/1990 | Hegarty |
| 5,217,506 A * | 6/1993 | Edlund ................ B01D 53/228 55/524 |
| 5,240,476 A | 8/1993 | Hegarty |
| 5,375,995 A | 12/1994 | Dobbeling et al. |
| 5,454,220 A | 10/1995 | Althaus et al. |
| 5,482,457 A * | 1/1996 | Aigner ................. F23D 11/402 431/10 |
| 5,489,203 A * | 2/1996 | Dobbeling ............. F23C 7/002 431/173 |
| 5,588,826 A * | 12/1996 | Dobbeling et al. ........... 431/354 |
| 5,937,632 A | 8/1999 | Dobbeling et al. |
| 6,139,605 A * | 10/2000 | Carnell .............. B01D 53/1456 95/164 |
| 6,165,428 A * | 12/2000 | Eijkhoudt ............. B01D 53/02 423/210 |
| 6,463,741 B1 * | 10/2002 | Frutschi .......................... 60/780 |
| 6,679,061 B2 * | 1/2004 | Steinbach ................. F23R 3/40 431/7 |
| 7,137,257 B2 * | 11/2006 | Drnevich et al. ............... 60/775 |
| 7,162,864 B1 * | 1/2007 | Schefer ................... F23C 99/00 123/1 A |
| 7,266,940 B2 | 9/2007 | Balan et al. |
| 2004/0172951 A1 | 9/2004 | Hannemann et al. |
| 2004/0226299 A1 * | 11/2004 | Drnevich .................. F02C 3/22 60/772 |
| 2006/0027331 A1 | 2/2006 | Hirai et al. |
| 2006/0035183 A1 * | 2/2006 | Carroni et al. ................... 431/7 |
| 2007/0072949 A1 * | 3/2007 | Ruud .................. B01D 53/229 518/702 |
| 2007/0107437 A1 | 5/2007 | Evulet et al. |
| 2007/0259296 A1 * | 11/2007 | Knoepfel .............. F23D 17/002 431/9 |
| 2007/0275337 A1 | 11/2007 | Heilos et al. |
| 2008/0081844 A1 * | 4/2008 | Shires ........................ C01B 3/36 518/703 |
| 2008/0112867 A1 * | 5/2008 | Wei ...................... B01J 19/2475 423/224 |
| 2008/0280239 A1 * | 11/2008 | Carroni ................... F23C 7/002 431/9 |
| 2009/0044539 A1 | 2/2009 | Eroglu et al. |
| 2009/0123882 A1 * | 5/2009 | Eroglu ..................... F23C 7/002 431/8 |

FOREIGN PATENT DOCUMENTS

| | | |
|---|---|---|
| EP | 0610722 A1 | 8/1994 |
| EP | 0620362 A1 | 10/1994 |
| EP | 0 636 599 A1 | 2/1995 |
| EP | 0651042 A1 | 5/1995 |
| EP | 0704657 A2 | 4/1996 |
| EP | 0849451 A2 | 6/1998 |
| EP | 1277920 A1 | 1/2003 |
| EP | 1568942 A1 | 8/2005 |
| EP | 1741899 A2 | 1/2007 |
| JP | 7-53441 A | 2/1995 |
| JP | 2002-520423 A | 7/2002 |
| JP | 2003049610 A2 | 2/2003 |
| JP | 2004060471 A2 | 2/2004 |
| JP | 2004076639 A2 | 3/2004 |
| JP | 2004-331701 A | 11/2004 |
| JP | 2006-522004 A | 9/2006 |
| WO | 00/02644 A1 | 1/2000 |
| WO | 2004/089499 A2 | 10/2004 |
| WO | 2004/089499 A3 | 10/2004 |
| WO | 2006058843 A1 | 6/2006 |
| WO | 2006069861 A1 | 7/2006 |
| WO | 2007017486 A1 | 2/2007 |
| WO | 2007113074 A1 | 10/2007 |

OTHER PUBLICATIONS

Dr. Dilip K. Mukherjee "State of the art gas turbines—a brief update" ABB Review Feb. 1997, pp. 4-14.

Dr. Franz Joos et al. "Field experience with the sequential combustion system of the GT24/GT26 gas turbine family" ABB Review May 1998, pp. 12-20.

Nilsson, Bertil "GTX100—a new high performance gas turbine" ABB Review Jun. 1997, pp. 4-12.

Haupt, G. "Efiziente und umweltfreundliche Stromerzeugung im GUD-Kraftwerk mit integrierter Vergasung" Elektrotechnik unde Informationstechnik, Springer Verlag, Wien, AT, vol. 113, No. 2, Feb. 1, 1996, pp. 102-108, XP000555695, ISSN: 0932-383X.

An English Language Translation of the Office Action (Final Notification of Reasons for Refusal) dated Sep. 2, 2013, by the Japanese Patent Office in corresponding Japanese Patent Application No. 2010-535323. (4 pages).

Communication pursuant to Article 94(3) EPC dated Jun. 5, 2018, by the European Patent Office in corresponding European Patent Application No. 08 855 102.3 (5 pages).

\* cited by examiner

METHOD FOR OPERATING A GAS TURBINE INSTALLATION AND EQUIPMENT FOR CARRYING OUT THE METHOD

CROSS REFERENCE TO RELATED APPLICATION

This application is a continuation of International Application No. PCT/EP2008/065158 filed Nov. 7, 2008, which claims priority to Swiss Patent Application No. 01839/07, filed Nov. 27, 2007, the entire contents of all of which are incorporated by reference as if fully set forth.

FIELD OF INVENTION

The present invention relates to the field of power generation. It refers to a method for operating a gas turbine installation and to equipment for carrying out the method.

BACKGROUND

When combusting fossil fuels in power generating plants, the question of $CO_2$ emission acquires increasing significance in the course of climate discussion.

So-called "polygeneration" systems or plants, in which a synthesis gas, gaseous nitrogen and liquid hydrogen are produced from a carbonaceous feedstock, such as coal, by gasification and reforming, are known (see, for example, U.S. Pat. No. 4,936,869). The synthesis gas is fed for combusting to the combustion chamber of a gas turbine installation, which is part of a combined cycle power plant, and with the hot exhaust gases from the gas turbine steam is produced in a water/steam cycle for operating a steam turbine. The two turbines generate electric power, while some of the steam which is produced is used for reforming. In addition, thermal energy for process or heating purposes can be extracted from the combined cycle power plant. The electric power which is generated can be used in the plant itself, but can also be delivered to external consumers. The hydrogen which is produced, which can be of high purity (99.9%), can be used for example for chemical processes such as the production of artificial fertilizers.

If in the case of such a plant the fuel for the gas turbine should contain a high portion of hydrogen, if the $CO_2$ which results during the gasification were to be separated out, the emission of $CO_2$ with the exhaust gases of the gas turbine would be low (would correspond to an approximately 90% retention of $CO_2$). Such "$CO_2$-free" power generating plants, however, would be ready for operation only when fuels with a high hydrogen portion could be combusted in a gas turbine (with or without sequential combustion) reliably and without significant dilution. In order to achieve an approximately 90% retention of $CO_2$, however, an effective development of new burner technologies would be necessary, which are currently not available.

Furthermore, gas turbine installations with sequential combustion have been known for a long time (see, for example, D. K. Mukherjee, "State-of-the-art gas turbines—a brief update", ABB Review February 1997, p. 4-14 or F. Joos et al., "Field experience with the sequential combustion system of the GT24/GT26 gas turbine family", ABB Review May 1998, p. 12-20). For such gas turbine installations, proposals for reducing $CO_2$ emission, which are based on exhaust gas recycling (see, for example, US-A1-2006/0272331), have already been made. Such gas turbine installations with sequential combustion, however, have already been used as part of a combined cycle power plant with integrated coal gasification (see, for example, WO-A1-2007/017486), wherein the syngas which is produced during gasification is used as fuel both in the first combustion chamber and in the second combustion chamber.

In the case of the known gas turbine installations with sequential combustion (see EP-0 620 362 A1), so-called EV burners are used in the first combustion chamber (see EP 0 321 809 A1 and the developments carried out since then). In the second combustion chamber, so-called SEV burners are correspondingly incorporated (see the abovementioned printed publications). In the past, particularly high-capacity burner types have been developed for the first combustion chamber (so-called AEV burners or Advanced EV burners) (B. Nilsson, "GTX100—a new high-performance gas turbine" ABB Review June 1997, p. 4-12, FIG. 3; WO-A1-2006/069861, or EP-0 704 657 A2 and further developments derived therefrom), which are formed as premix burners in which gaseous fuels are injected both in a premix device and in a subsequent mixer tube.

Finally, a gas turbine installation with $CO_2$ separation, which comprises two separate gas turbine systems which in each case have a compressor, a combustion chamber and a turbine, is known from EP-A2-1 741 899. Some of the air which is compressed in the first compressor in this case is fed to the second combustion chamber as combustion air, while the exhaust gases of the second turbine are fed back to the second compressor and also compressed there. $CO_2$ is then separated out from the compressed gases. Both gas turbine systems are linked in each case to a combined cycle power plant via a heat recovery steam generator with a water/steam cycle. In the first combustion chamber, pure hydrogen is combusted, and in the second combustion chamber for example natural gas can be used as fuel. The hydrogen can be supplied externally or can be produced by internal reforming. As a result of operating the one (first) combustion chamber with pure hydrogen, if the $CO_2$ which results during hydrogen production is separated out, the $CO_2$ emission is already significantly reduced. In this case, however, it is disadvantageous that the first gas turbine system has to be designed for operating with pure hydrogen, which is not the case in already existing or fully developed plants.

All the printed publications which are quoted above form an integrating element of this description.

SUMMARY

The present disclosure is directed to a method for operating a gas turbine installation having at least one compressor for compressing combustion air, at least one combustion chamber for combusting a supplied fuel using the compressed combustion air, and at least one turbine which is exposed to throughflow by the hot gases from the at least one combustion chamber. In the installation, both a first fuel, on a carbon base, particularly in the form of natural gas, and a second fuel, in the form of a hydrogen-rich fuel or pure hydrogen, are used as fuel. The method includes intermixing and combusting the first and the second fuels together in the at least one combustion chamber.

The invention is also directed to equipment for operating a gas turbine installation having at least one compressor for compressing combustion air, at least one combustion chamber for combusting a supplied fuel, using the compressed combustion air, and at least one turbine which is exposed to throughflow by the hot gases from the at least one combustion chamber. In the installation, both a first fuel on a carbon base, in the form of natural gas, and a second fuel (15, 19), in the form of a hydrogen-rich fuel or pure hydrogen, are used as fuel. The first and the second fuels are intermixed and combusted together in the at least one combustion chamber. The at least one combustion chamber includes a separate fuel feed for the first and second fuels.

BRIEF DESCRIPTION OF THE DRAWINGS

The invention is to be subsequently explained in more detail based on exemplary embodiments in conjunction with the drawing. In the drawing

DETAILED DESCRIPTION OF THE PREFERRED EMBODIMENTS

Introduction to the Embodiments

Figure 1:
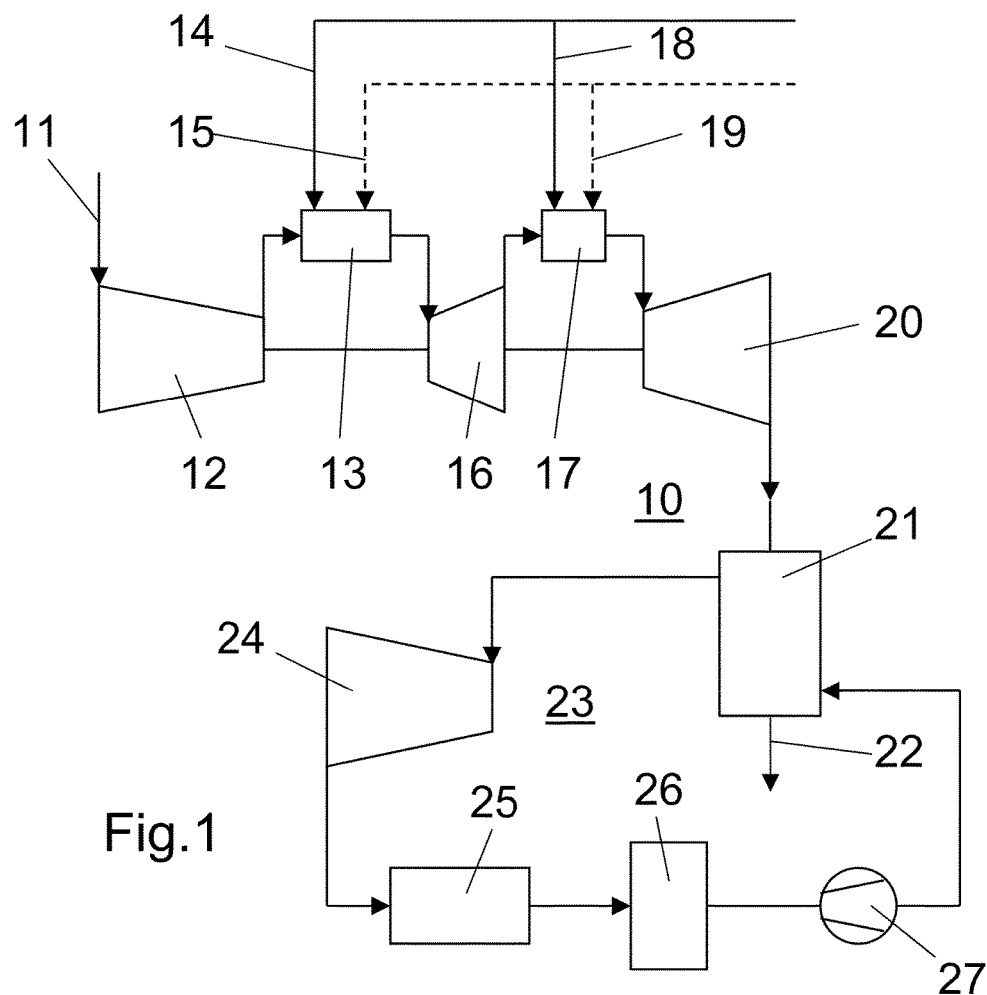
FIG. 1 shows a greatly simplified plant schematic diagram of a combined cycle power plant with sequential combustion in the gas turbine installation, and with a mixing of two fuels according to an exemplary embodiment of the invention.

It is an object of the invention to disclose a gas turbine installation and a method for its operation, which, without new construction, on the one hand ensure high efficiency and on the other hand enable a partial retention of $CO_2$ in the order of magnitude of about 30-70%.

The object is achieved by the entirety of the features of claims 1 and 7. It is essential for the invention that both a first fuel on a carbon base, especially in the form of natural gas, and also a second fuel, in the form of a hydrogen-rich fuel or pure hydrogen, is used as fuel, wherein the first and the second fuels are intermixed and combusted together in the at least one combustion chamber. As a result of the "dilution" of the hydrogen or of the hydrogen-rich fuel with natural gas or the like, a reliable operation of the gas turbine installation is enabled without significant losses in efficiency, as would otherwise occur when diluting with $N_2$ or steam, without substantial modifications having to be carried out on the plant or on the burners. The extent of retention of $CO_2$ in this case is determined by the ratio of hydrogen or hydrogen-rich fuel to the diluting medium (for example natural gas).

In one development of the invention, the gas turbine installation is designed as an installation with sequential combustion in at least two combustion chambers in series, to which a turbine is connected downstream in each case, and in that in each of the combustion chambers a mixture comprising the first and second fuels is combusted.

If the combustion chamber, or combustion chambers, is or are equipped with premix burners, it is advantageous if in the flow direction first of all, the first fuel is injected and further downstream, the second fuel is injected.

If the premix burners especially have a premix device and a subsequent mixer tube, the first fuel is injected in the premix device and the second fuel is injected in the mixer tube.

In another development of the method according to the invention, the gas turbine installation is part of a combined cycle power unit, in that the hot exhaust gases of the gas turbine installation are used for producing steam, and in that the steam which is produced is used for producing the second fuel.

In one development of the device according to the invention, the gas turbine installation is designed as an installation with sequential combustion in at least two combustion chambers in series, to which a turbine is connected downstream in each case, and in that on each of the combustion chambers provision is made for a separate fuel feed for the first and second fuels.

In particular, the combustion chamber, or combustion chambers, is or are equipped with premix burners, wherein on the premix burners the fuel feed for the first fuel is arranged upstream of the fuel feed for the second fuel in each case.

The premix burners preferably have a premix device and a subsequent mixer tube in each case, and the fuel feed for the first fuel leads into the premix device and the fuel feed for the second fuel leads into the mixer tube.

In a further development, the gas turbine installation is part of a combined cycle power unit which comprises a separate water/steam cycle with a heat recovery steam generator, a steam turbine, a condenser, a feedwater tank and a feedwater pump, and in that the heat recovery steam generator is exposed to throughflow by the exhaust gases of the gas turbine installation.

Provision is especially made for additional first devices for producing syngas from a carbonaceous feedstock, which are in communication with the water/steam cycle and with the fuel feed for the second fuel.

The first device for producing syngas preferably comprises an air separation unit, a gasification unit, a cooling and hydrolysis unit, a MDEA wash unit and a metal carbonyl removal unit, which are connected in series in the flow direction. In addition, provision can be made for second device for producing pure hydrogen, which is connected downstream to the first device, and which especially comprises a membrane separation unit and a PSA purification unit.

DETAILED DESCRIPTION

In FIG. 1, a greatly simplified plant schematic diagram of a combined cycle power plant with sequential combustion in the gas turbine installation and with a mixing of two fuels according to an exemplary embodiment of the invention is reproduced. The combined cycle power unit 10 comprises a gas turbine installation 11, . . . , 20 and also a water/steam cycle 23 which is connected to it. The gas turbine installation is equipped with sequential combustion. The gas turbine installation comprises a compressor 12, a subsequent first combustion chamber, a first turbine 16, a subsequent second combustion chamber 17 and a second turbine 20. Air is drawn in by the compressor 12 via an air inlet 11 and compressed. The compressed air is introduced as combustion air into the first combustion chamber 13 and is used there in part for combusting a fuel mixture which is made available by two separate fuel feeds 14 and 15. The first fuel feed 14 comprises a fuel on a carbon base, especially natural gas. The second fuel feed 15 (drawn in a broken line in FIG. 1) concerns a hydrogen-rich fuel or pure hydrogen.

The hot gases which result during the combustion in the first combustion chamber 13 are expanded in the first turbine 16, performing work, and then introduced into the second combustion chamber 17 where the rest of the air is used for combusting a fuel which in this example also consists of a fuel mixture which is made available by way of two separate fuel feeds 18 and 19 and also comprises a fuel on a carbon base, especially natural gas, and a hydrogen-rich fuel or pure hydrogen.

The hot exhaust gases of the second combustion chamber 17 are expanded in the second turbine 20, performing work, and then reach a downstream heat recovery steam generator 21 which is part of the water/steam cycle 23. In the heat recovery steam generator 21, feed water, which originates from a feedwater tank 26 and is delivered by a feedwater pump 27, is converted into superheated steam which drives a single-stage or multistage steam turbine 24, is then condensed in a condenser 25 and as condensate flows back into the feedwater tank 26.

Figure 2:
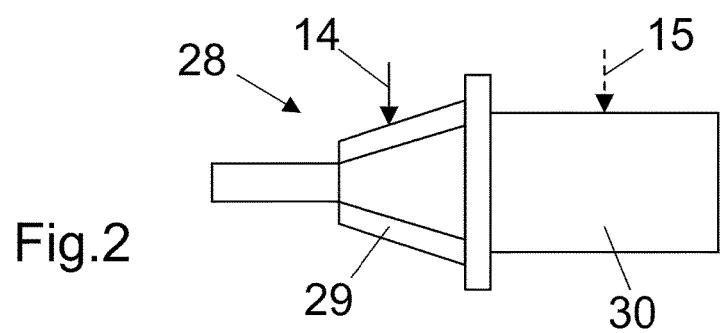
FIG. 2 shows a simplified view of an AEV burner, as is exemplarily described in EP-0 704 657 A2 and WO-A1-2006/09861 and advantageously used in the plant according to FIG. 1.

In the first combustion chamber 13, premix burners in the form of so-called EV burners (see, for example, EP-0 321 809) and/or AEV burners (see, for example, EP-0 704 657) are preferably used, as are described in the printed publications referred to in the introduction. In the second combustion chamber 17, so-called SEV burners (see, for example, EP-0 620 362) are correspondingly used. A premix burner of the AEV type, as is exemplarily described in WO-A1-2006/09861, is reproduced in FIG. 2 in a greatly simplified manner. The premix burner 28 of FIG. 2 comprises a premix device 29 in the form of a double cone and a mixer tube 30 connected to it, which are arranged one after the other in the flow direction. In the premix device 29, air flows in from outside between the conical shells into which the first fuel (natural gas) is injected via a plurality of nozzle orifices which are perpendicular to the cone surface. The vortex of fuel/air mixture then enters the essentially cylindrical mixer tube 30 where the second fuel (pure $H_2$ or $H_2$-rich fuel) is injected via passages in the tube wall, and intermixes with the fuel-air mixture from the premix device 29. The resulting gas mixture then discharges from the mixer tube 30 and combusts in the adjoining combustion space. A comparable mixture can also be realized in the SEV burners of the second combustion chamber 17.

The hydrogen which is used for combustion can basically be supplied from outside the plant. It is particularly favorable, however, if the combined cycle power unit 10 of FIG. 1 is part of an overall plant with polygeneration, as is exemplarily shown in FIG. 3. In the overall plant according to FIG. 3, a gas is produced from a supplied feedstock 62 (for example tar from a visbreaker plant) in a gasification unit 32, the gas, after cooling and carbonyl sulfide (COS) hydrolysis in a cooling and hydrolysis unit 35, separating of acid gases ($CO_2$) in a Methyl diethanolamine (MDEA) wash unit and separating of metal carbonyl in a metal carbonyl removal unit 39, is fed as hydrogen-rich syngas 48 to the combined cycle power unit 10 as the second fuel, while natural gas 50 is fed as the first fuel.

The combined cycle power unit 10 on the one hand delivers electric power 47 to the outside, and on the other hand delivers steam 49 which as steam 53 is fed to an air separation unit 31 and as high-pressure steam 60 is fed to the gasification unit 32. In the air separation unit (ASU) 31, air 58 is separated into nitrogen 59 and oxygen 54. The oxygen 54 is used in the gasification unit 32 for gasifying the feedstock 62. In addition, feed water 61 is supplied and also water 55 which has been recovered from the dirty water 56 of the gasification unit 32 and fed back from a water filtration unit 33. From the water filtration unit 33, a filter cake 57 reaches an ash filtration unit 34 which in its turn discharges metal ash 64 and flue gas 65.

From the water filtration unit 33, water furthermore reaches a dirty water removal unit 36 which removes acid gases 51 and delivers them to a sulfur processing unit 37 which in its turn provides sulfur 42 at the outlet. The sulfur processing unit 37 additionally receives acid gas from the MDEA wash unit 38. The MDEA wash unit 38 discharges carbon dioxide 43 to the outside, which can be collected. The dirty water removal unit 36 discharges waste water 63 to the outside.

The metal carbonyl which is removed from the gas by the metal carbonyl removal unit 39 is delivered as spent carbon 52 to the ash filtration unit 34. Finally, the hydrogen is extracted from some of the syngas 48 in a membrane separation unit 41, is fed as raw hydrogen 46 to a PSA purification unit 40, and is purified there, forming pure hydrogen 44. The residual gas 45 which results during the membrane separation (41) and during the PSA purifying (40) is processed in the combined cycle power unit 10.

Figure 3:
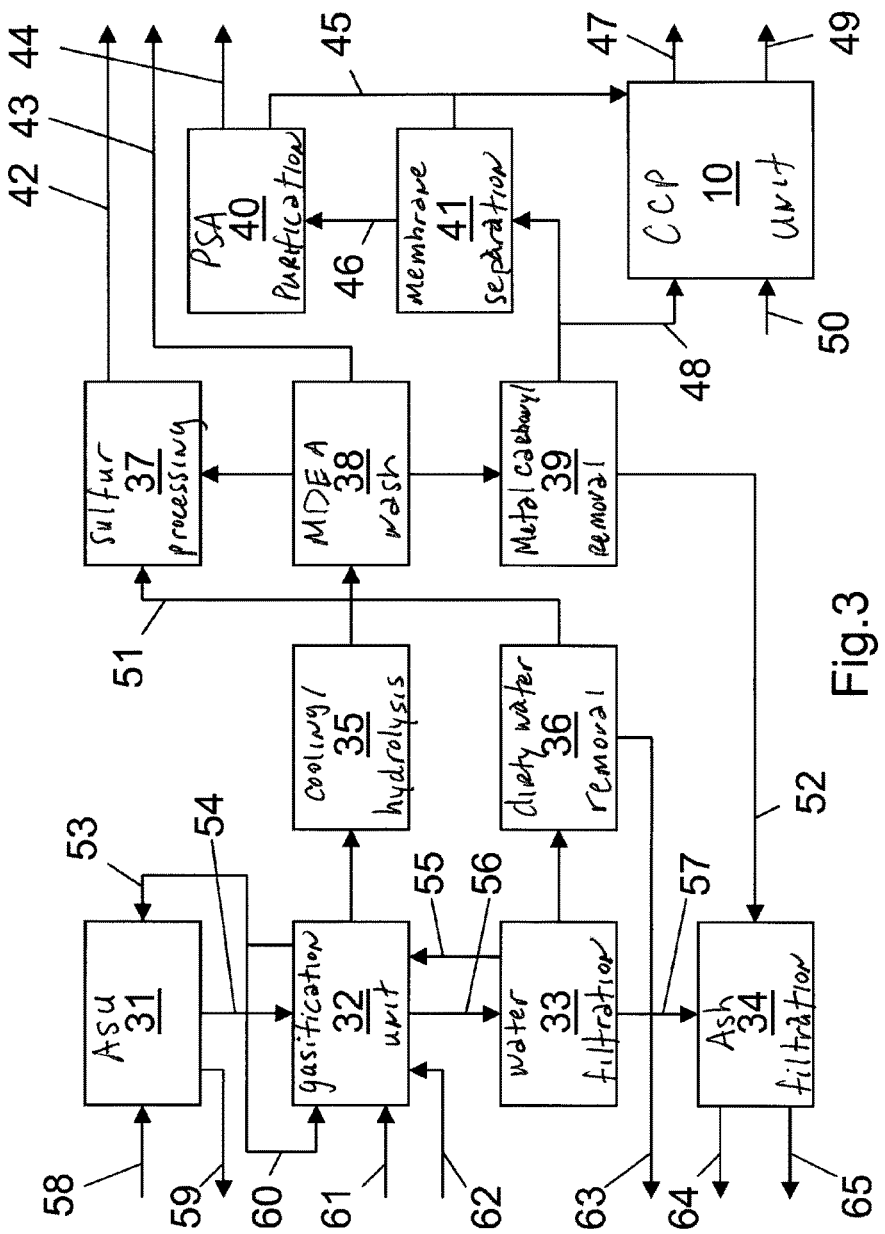
FIG. 3 shows a greatly simplified plant schematic diagram of a polygeneration plant, as is suitable for realization of the invention.

In the example of FIG. 3, the syngas which is produced is used exclusively as hydrogen-rich second fuel. It is also conceivable however to use the pure hydrogen 44 in this function.

In all, the invention includes the following characteristic features and advantages:

By using natural gas as a "diluter", a reliable operation of the gas turbine with hydrogen-rich fuel is possible without there being significant limitations in operation or in efficiency, as are normally to be expected in the case of "dilutants" such as $N_2$ or steam. As a result of this, significant modifications when designing the plants can be dispensed with.

Natural gas can be mixed with hydrogen; this mixture can be injected in stages. This means that less $N_2$ or steam has to be used for "diluting" the $H_2$. At the same time, the mixed fuel can be injected better (pure $H_2$ jets are very weak and have a low penetration depth).

Natural gas and hydrogen can also be injected in one burner one after the other in the flow direction in order to then be intermixed.

In polygeneration plants, in which purge hydrogen is left over from the production of methanol, the $H_2$ can be mixed with the natural gas fuel of the gas turbine. As a result, the emission of $CO_2$ per generated unit of power is reduced, if it is assumed that the $CO_2$ which results during $H_2$ production is held back.

Combusting small amounts of $H_2$ in natural gas is not a problem for the existing lean premix burners of the AEV type.

The invention may not only be used in plants which during normal operation are operated with natural gas but also in plants in which natural gas is used only as fuel for starting or supporting continuous operation.

LIST OF DESIGNATIONS

10 Combined cycle power unit
11 Air inlet
12 Compressor
13, 17 Combustion chamber
14, 15, 18, 19 Fuel feed
16, 20 Turbine
21 Heat recovery steam generator
22 Flue gas
23 Water/steam cycle
24 Steam turbine
25 Condenser
26 Feedwater tank
27 Feedwater pump
28 Premix burner
29 Premix device 30 Mixer tube
31 Air separation unit (ASU)
32 Gasification unit
33 Water filtration unit
34 Ash filtration unit
35 Cooling and hydrolysis unit
36 Dirty water removal unit
37 Sulfur processing unit
38 MDEA wash unit
39 Metal carbonyl removal unit
40 PSA purification unit
41 Membrane separation unit
42 Sulfur
43 Carbon dioxide
44 Hydrogen
45 Residual gas
46 Raw hydrogen
47 Electric power
48 Syngas
49 Steam
50 Natural gas
51 Acid gas
52 Spent carbon
53 Steam
54 Oxygen
55 Feedback water
56 Dirty water
57 Filter cake
58 Air
59 Nitrogen
60 High-pressure steam
61 Feed water
62 Feedstock
63 Waste water
64 Metal ash
65 Flue gas

What is claimed is:

1. A method for operating a gas turbine installation in a plant, the gas turbine installation comprising at least one compressor for compressing combustion air, at least one combustion chamber for combusting a supplied fuel using the compressed combustion air, and at least one turbine which is exposed to throughflow by hot gases from the at least one combustion chamber, wherein both a first fuel on a carbon base, in the form of natural gas, and a second fuel, exclusively in the form of pure hydrogen, are used simultaneously as the supplied fuel, the method comprising:
   producing raw hydrogen gas from a feedstock of the plant;
   processing the raw hydrogen gas to produce the pure hydrogen used as the second fuel; and
   intermixing and combusting, using premix burners arranged in the at least one combustion chamber, the first and the second fuels together simultaneously in the at least one combustion chamber, the premix burners each comprising a premix device in the form of a double cone and a mixer tube connected to a downstream end of the premix device, relative to a flow direction through the premix burners,
   wherein the first fuel is injected in the premix device via a plurality of nozzles formed on the double cone that are perpendicular to a cone surface of the premix device, and the second fuel is injected as a flow of the pure hydrogen downstream of the premix device via passages in a wall of the mixer tube to dilute the second fuel using the injected first fuel as a diluter.

2. The method as claimed in claim 1, wherein the gas turbine installation is designed as an installation with sequential combustion in at least two combustion chambers in series, to which a turbine is connected downstream in each case, and in that in each of the combustion chambers a mixture comprising the first and second fuels is combusted.

3. The method as claimed in claim 1, wherein the gas turbine installation is part of a combined cycle power unit, and hot exhaust gases of the gas turbine installation are used for producing steam.

4. The method as claimed in claim 3, wherein the steam which is produced is used for producing the second fuel.

5. The method as claimed in claim 1, wherein production of the raw hydrogen gas includes processing the gas from the feedstock of the plant using at least a gasification unit, a cooling and hydrolysis unit, a methyl diethanolamine (MDEA) wash unit, a metal carbonyl removal unit, and a membrane separation unit.

6. The method as claimed in claim 5, wherein a first gas output from gasification unit is cooled and undergoes carbonyl sulfide hydrolysis in the cooling and hydrolysis unit.

7. The method as claimed in claim 6, wherein a second gas output from the cooling and hydrolysis unit undergoes acid gas separation in the MDEA wash unit.

8. The method as claimed in claim 7, wherein a third gas output from the MDEA wash unit is processed in the metal carbonyl removal unit.

9. The method as claimed in claim 8, wherein a fourth gas output from the metal carbonyl removal unit is fed to the membrane separation unit to produce the raw hydrogen gas.

* * * * *